(12) United States Patent
Kita et al.

(10) Patent No.: US 7,289,997 B1
(45) Date of Patent: Oct. 30, 2007

(54) SYSTEM AND METHOD FOR AN EXTENSIBLE METADATA DRIVEN APPLICATION FRAMEWORK

(75) Inventors: Jefferson A. Kita, Newton, MA (US); Thomas J. Bakerman, Acton, MA (US); Mark B. Hecker, Northborough, MA (US); Brian Rickman, Marlborough, MA (US); Kristian R. Cibulskis, Cambridge, MA (US)

(73) Assignee: SUN Microsystems, Inc., Santa Clara, CA (US)

( * ) Notice: Subject to any disclaimer, the term of this patent is extended or adjusted under 35 U.S.C. 154(b) by 554 days.

(21) Appl. No.: 10/831,474

(22) Filed: Apr. 23, 2004

(51) Int. Cl.
*G06F 17/30* (2006.01)
*G06F 17/00* (2006.01)

(52) U.S. Cl. .............................. 707/100; 707/1; 707/3; 707/4; 707/103 R; 707/104.1; 707/103 Y

(58) Field of Classification Search ............ 707/103 Y, 707/103 R, 100, 1, 3, 4, 104.1
See application file for complete search history.

(56) References Cited

U.S. PATENT DOCUMENTS

| | | | | |
|---|---|---|---|---|
| 6,163,776 A | * | 12/2000 | Periwal | 707/4 |
| 7,031,956 B1 | * | 4/2006 | Lee et al. | 707/3 |
| 7,043,490 B2 | * | 5/2006 | Choy et al. | 707/101 |
| 7,072,896 B2 | * | 7/2006 | Lee et al. | 707/101 |
| 2005/0050074 A1 | * | 3/2005 | Jain et al. | 707/100 |
| 2005/0198630 A1 | * | 9/2005 | Tamma et al. | 717/175 |
| 2006/0206502 A1 | * | 9/2006 | Gaurav et al. | 707/100 |
| 2006/0206523 A1 | * | 9/2006 | Gaurav et al. | 707/104.1 |

* cited by examiner

*Primary Examiner*—Don Wong
*Assistant Examiner*—Thanh-Ha Dang
(74) *Attorney, Agent, or Firm*—Chapin IP Law, LLC; Barry W. Chapin, Esq.

(57) ABSTRACT

Application code maintenance often imposes rebuilding and/or a patch kit update from a source code vendor. Users of such applications often find such conventional rebuilds and install efforts intrusive. An extensible object-relational (O-R) model operable for dynamic additions to an existing baseline of modeled data specifications mitigates interim patches and builds by employing a scripted modeling form and a corresponding relational form. The scripted modeling form, such as an XML file, is readily modifiable from existing data specifications, such as those driven by a recognized standard, while the relational form is seamlessly updated within an existing application environment without requiring rebuilding or patch kits to implement. The extensible O-R model defines data characteristics of data specifications, and the relational model is updated by instantiating an object or entry into the modeled relational specifications based on the extensible O-R model. In this manner, an incremental update to a set of relational specifications implements an addition or modification to a data specification rather than requiring a more global build, update, or install kit.

21 Claims, 9 Drawing Sheets

SYSTEM AND METHOD FOR AN EXTENSIBLE METADATA DRIVEN APPLICATION FRAMEWORK

BACKGROUND OF THE INVENTION

In a typical conventional managed information environment, users employ applications installed in the environment, typically within an interconnected or clustered set of computer systems including a LAN or intranet. Often, such conventional applications are complex, and employ a variety of code and data sources. Frequently, such applications employ data sources codified as data specifications from an external source. Data specifications from an external source, such as published standards maintained by an established and recognized standards body, are subject to periodic revisions and updates.

Typical modern software application development efforts require that applications be capable of rapid modifications of user-visible features through the Graphical User Interface (GUI) and Command Line Interface (CLI), and that the conventional applications be able to rapidly add capabilities of absorbing and rendering new types of information, such as revision to a published standard. It is preferable that such applications be field-modifiable to extend capabilities. Modern applications should therefore be highly adaptive on two fronts. First, they need to provide capability to allow users to quickly add and modify features and feature sets. Second, they need to be adaptable to new information sources, sources not known at the time the application is released to customers. In the storage industry, in particular, the need exists for monitoring and management applications to adapt quickly to completely new storage device types and new versions of existing storage device types with added capabilities, and to add support for those devices as quickly as possible. The software frameworks supporting these conventional applications require significant field extensibility and data-driven characteristics so that their behavior in the field may be modified through changes only to their data definitions, and not require code modification with consequent re-qualification and re-release.

Typically, a conventional data specification codifying such a published standard is incorporated or introduced into an application environment by identifying the application objects or entities which employ the data specification, and revising the objects or entities, such as code files, accordingly. Often, however, the objects and entities employing the data specification are integrated throughout the application by being compiled, or built, into the application. Accordingly, updating the application environment to recognize the new data specification may require development of a revised object or entity by a source code or device vendor, and/or may trigger a rebuild (recompilation and bind/link) of the application environment in order to propagate the changes made to such an external data specification.

SUMMARY

Configurations of the invention are based, in part, on the observation that updates to conventional data specifications, particularly external data specifications such as those promulgated by a standards authority or board, tend to be cumbersome and unwieldy to implement across an application environment employing the conventional data specification. Frequently, such conventional data specifications are codified in the application environment as multiple code files, often based in different source languages. Maintaining application integrity may require rebuilding a substantial part of the installed application, and/or require a patch kit or update from a source code vendor. Such conventional rebuilds and install efforts frequently require a lag time for development of an appropriate patch or install kit, and further mandate system coordination and downtime to propagate the updates across the application. Conventional users of such applications often find such downtime intrusive and frustrating to the typical workflow, particularly when the data standard is subject to frequent updates and/or revisions.

One conventional approach to maintaining a flexible interface to a large body of data is to interface an object model, such as a C++ or Java based interface, with a non-volatile data repository such as a relational database. Often, large bodies of data are stored in a relational database because of the extensive query and retrieval capability available through relational databases. Other motivations may simply be a legacy application which has accrued such a repository over years of operation. In either case, a large quantity of data remains accessible via a relational DBMS (Database Management System), typically provided by a relational database vendor such as Oracle® corporation, of Redwood Shores, Calif. While such conventional DBMSs provide substantial query and retrieval capability, conventional attempts at seamless integration with object oriented applications have potential shortcomings. One conventional approach is to retrieve an entire portion of the database into an object structure of the retrieving application, such as a Java or C++ application, and manipulate the retrieved data via the Java or C++ application. Such an approach, however, bypasses the substantial query and retrieval optimization which may be present with the relational DBMS. Such a conventional approach tends to sacrifice performance for ease of integration, mitigating the advantage of a dedicated DBMS and associated query engine. Accordingly, it would be beneficial to provide a mechanism to maintain and access the relational data in an atomic, granular form directly in the relational DB, without retrieving whole data sets or tables via a few specialized application pipes for local manipulation by an application language which may not necessarily be specialized or optimized for manipulation of such large data sets.

Configurations of the invention discussed below employ an Object-Oriented (O-O) specification language that has been extended to include relational persistence attributes and specifications. Specification-driven frameworks have an advantage in that they do not require significant development of algorithmic solutions, but rather rely on complete specifications in conjunction with a processing (parsing/compilation) engine. These specifications are readily checked for syntactical correctness and for following correct semantic rules and are more easily verified for correctness than are algorithms.

The exemplary specification is a set of XML documents conformant to an XML Schema (Table I, below) This XML Schema is a representation of the actual data model (object model and relational rendering information) in XML. As such, the XML Schema represents the data model's data model (metadata model), or Object-Relational (O-R) data model. The content of XML files that conform to the schema represent the data model. The application's data is stored in the data model's objects (and their mapped relation tables). While the relational tables themselves are all that are needed to store data for the data model, configurations may further store the structure of the data model itself in additional tables in the database, with an object model representation for code manipulation. This makes the data model available for querying and analysis by the application at run-time. Thus applications not only may query the application data itself, but also they may query about the data model, its composition and structure, and make decisions as to how to process application data and make it available to users through UI mechanisms. In other words, the metadata encapsulated in the O-R data model enables data driven data capture and display. Accordingly, applications may be driven from the metadata and dynamically adapt to new information in the database, not in the standard fashion by having a priori knowledge of the data model compiled into source code, but rather by querying the data model stored in the metadata, discovering the data model and responding accordingly.

For example, the Common Information Model (CIM) is a widely accepted, published standard known to those of skill in the art for, inter alia, defining storage formats of various forms of data associated with conventional data storage devices. Often, hardware and software vendors incorporate CIM compliant structures and objects into delivered products for ease of interoperability. However, as a published standard, product additions, such as new applications and storage devices, typically need CIM compliant object definitions to adaptively integrate into an existing customer baseline. Accordingly, vendors strive to deliver such a CIM compliant definition with a new product. Conventional development methods, however, employ a vendor developed CIM definition, accompanied by an install or patch kit, in order to provide compatibility with the new device in the established customer baseline. Such a conventional practice requires manual development of additional source code, followed by a rebuild and delivery, prior to enabling the new device at the customer site. Embodiments of the invention discussed herein avoid such lag time by allowing extensible, dynamic incorporation of the CIM definition merely by creating XML definitions of the new device, and adding relational database objects to correspond to the new device by appending the schema definitions to the O-R data model, thereby avoiding vendor supplied kits and rebuild which often result in development lag time.

Accordingly, embodiments of the invention substantially overcome the above described shortcomings of conventional data modeling methods, by providing an extensible object-relational (O-R) model operable for dynamic additions to an existing baseline of modeled data specifications, which employs a scripted modeling form and a corresponding relational form. The scripted modeling form is readily modifiable from existing sources of published and periodically updated data specifications, such as those driven by a recognized standard, while the relational form is seamlessly updated within an existing application environment without requiring rebuilding or patch kits to implement. The extensible O-R data model defines data characteristics of data specifications such as a published data standard, and the relational model is updated by instantiating an object or entry into the modeled relational specifications based on the extensible O-R data model. In this manner, an incremental update to a set of relational specifications implements an addition or modification to the data specification rather than requiring a more global build, update, or install kit to enable the application environment to recognize and utilize the data specification update. Configurations of the framework discussed further below present a data model that combines information from the object model with information about that model's rendering into a relational database, i.e. the complete application O-R data model.

Another framework component discussed below is persisting the structure of the O-R data model itself (the data-model's data model, or metadata model, shown and discussed further below with respect to FIG. 7) and providing it in a form accessible to the application. The configurations disclosed herein define a set of objects that represent the O-R data model (metadata-model). The configurations below implement a metadata loader to load the complete application data model from XML files conformant to the XML metadata schema into database tables that are the persisted relational form of the object model. This metadata loader module will load a compliant XML file into the meta-model. Further, in addition to loading new objects, the metadata loader can also modify or delete existing objects in the model.

Given such an implementation, configurations may implement the data model by writing XML source and loading it into the relational DB defining the metadata. However, there are many important and useful data models already available in various standard object description languages. In storage management the prevalent model definition language is the Meta-Object Format (MOF) as specified within the Common Information Model (CIM) defined by the Distributed Management Task Force (DMTF). That standard was chosen for the implementation because of its prevalent use in the storage industry, however any object specification language (e.g. CORBA's Interface Definition Language, or IDL) would be applicable. The MOF source files are then converted to an intermediate form of XML. Due to the use of CIM and MOF this implementation's intermediate XML form was CIM-XML, also a standard, though many other intermediate forms would work as well. As the MOF specification only describes objects, the intermediate XML therefore only contains the object portion of the full meta-data description. The relational persistence rendering for those objects is specified in separate XML files conformant to the metadata XML schema. These two streams are then merged into one XML stream that is conformant to the metadata XML schema and contains the complete application data model.

In further detail, exemplary configurations discussed further below disclose the method of generating code including generation of a metadata schema corresponding to data characteristics of a set of external data specifications (i.e. CIM), in which the metadata schema is receivable by a data repository, such as a relational database, for storing the identified characteristics. A mapper process maps a scripted format of the data specification to the generated metadata schema, and stores the data specification according to the mapping from the scripted format to the metadata schema. A relational database manager (RDBMS) creates, for each instance of a data object in the data specification, an instance of a schema object in the data repository according to the mapped metadata schema, i.e. the relational database schema representing the O-R data model.

The generation of the metadata schema is preceded by identifying the data specification employed by a user application, in which the data specification, such as the exemplary CIM, is indicative of data objects. A MOF compiler or other scanning process translates the identified data specification into a scripting format, such as XML, in which the scripting format is operable for parsing. The XML representation is employed for identifying characteristics of the data in the translated data specification, in which the characteristics are indicative of types of instances of the data.

In the exemplary configuration, the generated metadata schema is a relational representation indicative of entities and relations adapted to be stored in a relational repository (database), and the scripted form of the database schema is indicative of an object representation of classes of objects operable to include instances of other classes of objects. Further, the XML generator generates, for each instance of a data object in the data specification, a metadata specification defined in terms of the metadata schema. Each created instance is defined by a created table in the relational database according to the mapped metadata schema.

In the exemplary configuration, the metadata is the object to relational (O-R) data model indicative of interrelated tables having fields corresponding to the characteristics of the data, in which the interrelations operable to specify associations between the tables, such as an Entity-Relation (ER) diagram, common to those of skill in the art of relational database design. The exemplary data repository is therefore a relational database operable to store data according to normalized tables having fields, in which the tables correspond to entities in the schema and fields correspond to attributes. The associations associate tuples in the tables, in which the tuples correspond to rows of related values and the associations form joins with tuples of other tables.

Access to the generated classes, or tables, is provided by generating, for each data object mapped from the data specification, an access method operable to access the object. In the exemplary configuration, the access methods are javabeans operable to access the mapped object in a relational repository via accessing tables corresponding to the mapped objects.

The invention as disclosed above is described as implemented on a computer having a processor, memory, and interface operable for performing the steps and methods for monitoring and processing events in an information services network system as disclosed herein. Other embodiments of the invention include a computerized device such as a computer system, central processing unit, microprocessor, controller, electronic circuit, application-specific integrated circuit, or other hardware device configured to process all of the method operations disclosed herein as embodiments of the invention. In such embodiments, the computerized device includes an interface (e.g., for receiving data or more segments of code of a program), a memory (e.g., any type of computer readable medium), a processor and an interconnection mechanism connecting the interface, the processor and the memory. In such embodiments, the memory system is encoded with an application having components that when performed on the processor, produces a process or processes that causes the computerized device to perform any and/or all of the method embodiments, steps and operations explained herein as embodiments of the invention to allow execution of instructions in a computer program such as a Java, HTML, XML, C, or C++ application. In other words, a computer, processor or other electronic device that is programmed to operate embodiments of the invention as explained herein is itself considered an embodiment of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, with emphasis instead being placed upon illustrating the embodiments, principles and concepts of the invention.

DETAILED DESCRIPTION

The exemplary configuration discussed below provides an extensible object-relational (O-R) model, operable for dynamic additions to an existing baseline of modeled data specifications, by employing a scripted modeling form and a corresponding relational form. The scripted modeling form is readily modifiable from existing sources of published and/or periodically updated data specifications, such as those driven by a recognized standard, while a metadata generator seamlessly updates the relational form within an existing application environment without requiring rebuilding or patch kits to implement. The extensible O-R model defines data characteristics of data specifications such as a published data standard, and the relational model is updated by instantiating an object or entry into the modeled relational specifications based on the extensible O-R model. In this manner, an incremental update to a set of relational specifications implements an addition or modification to a data specification rather than requiring a more global build, update, or install kit to enable the application environment to recognize and utilize the data specification update.

Figure 1:
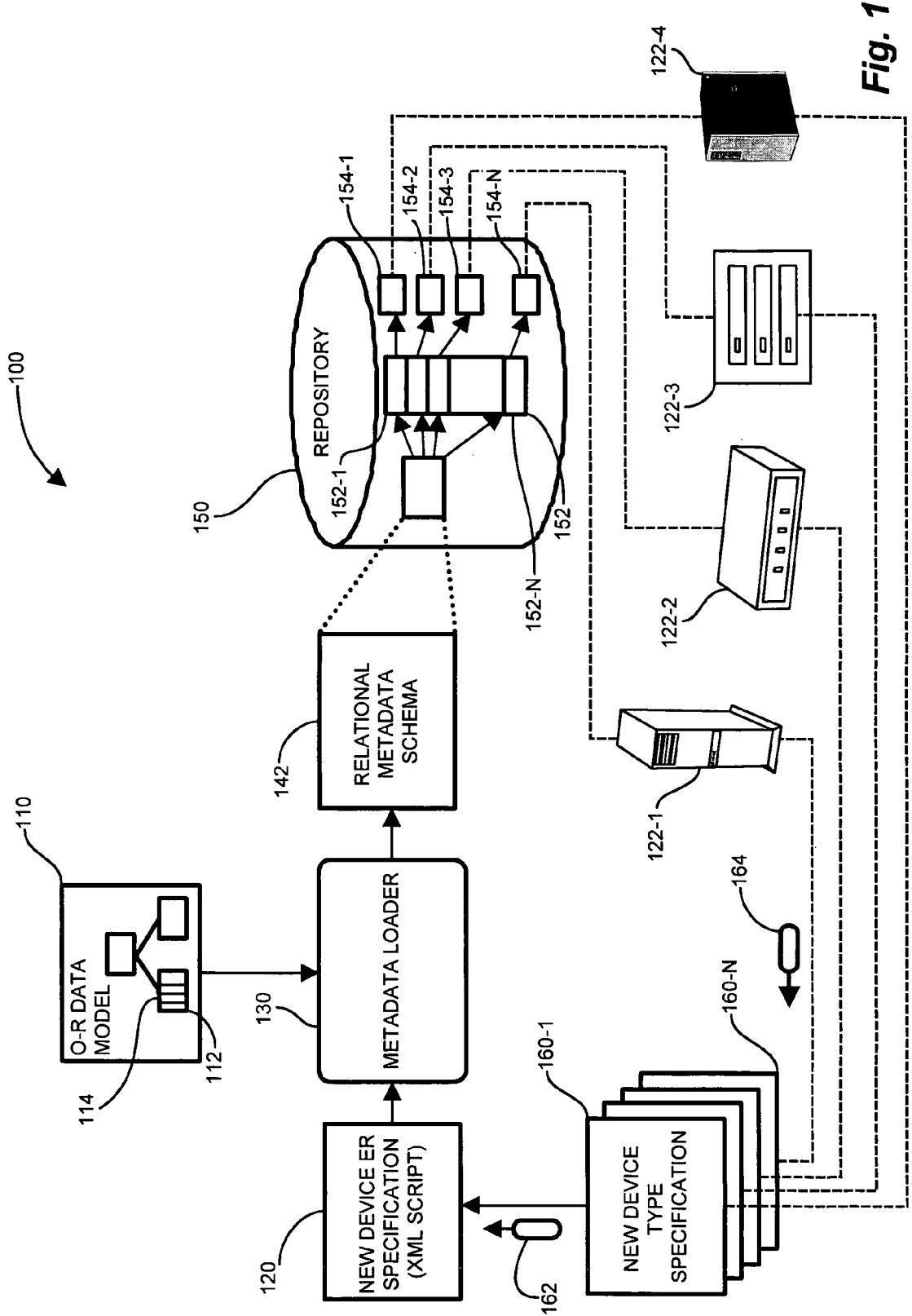
FIG. 1 is a context diagram of an object-relational (O-R) data model providing an extensible framework as defined herein in a managed information environment
Figure 8:
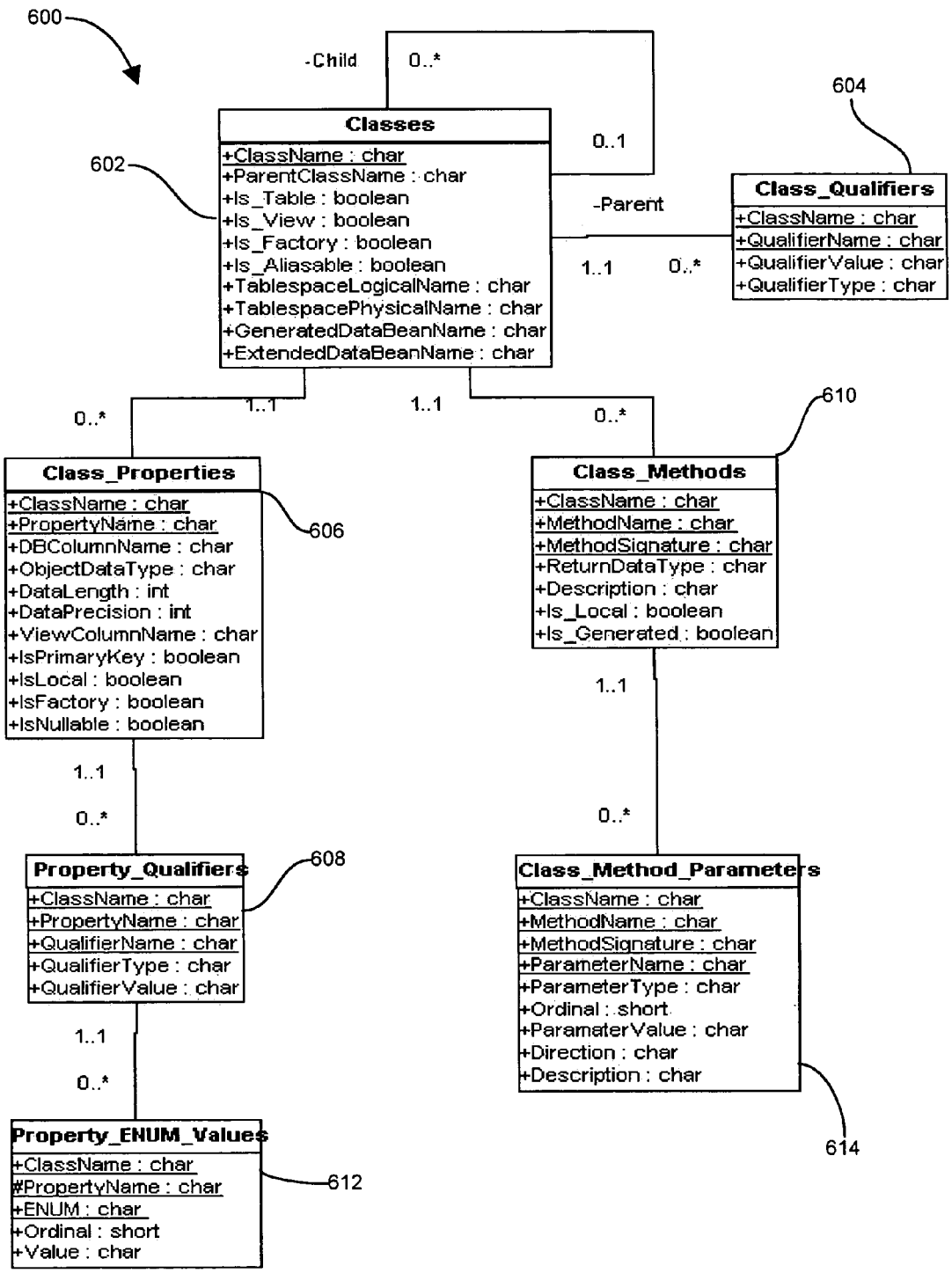
FIG. 8 is a schema diagram of the O-R data model of FIG. 3 having relational data entities.

FIG. 1 is a context diagram of an object-relational (O-R) data model providing an extensible framework as defined herein in a managed information environment 100. Referring to FIG. 1, in a particular configuration, the O-R data model 110 codifies a data schema defining a general object class of data. The general object class is an enumeration of fields defining a typical object oriented data class, as is known to those of skill in the art, and commonly employed in deployment languages such as Java, C++, and others. The particular O-R data model 110, shown and discussed in further detail below with respect to FIG. 8, is particularly applicable to a relational database, and identifies the tables 112 and fields 114 of a relational database representation of the model 110. The model 110 is expressible in several formats, such as a scripting language or an entity relation diagram. In the exemplary configuration herein, the model 110 is expressed in XML, and is operable with the metadata loader 130 for processing XML.

Employing the CIM example above, a user or operator generates a new device data specification 120 in XML, providing a data specification of the new device 122-N to be integrated into the existing baseline. The metadata loader 130 is operable on the XML specification 120 for generation a relational database metadata schema 142, from the O-R data model 110 and the new data specification 120. The specification 120 is derived from the operating parameters 160-N of the new device 122-N, provided or derived for the new device 160-N. The new device 160-N results in both the entity-relation definition of the format, or modeled characteristics 162 of data defining the new device (e.g. disk surfaces, spindles, platters, ports, etc.) and the actual data 164 for the device (i.e. 10 surfaces, 2 spindles, 4 ports, etc.).

The schema 142 is a standard form interpretable by the database 150 for creating new tables and fields therein. The database 150 creates new tables 154-1 . . . 154-N (154 generally, representing the object model in relational DB table form) corresponding to the new device 160, and also creates new entry (tuples) 152-N in the O-R table 152 corresponding to the O-R data model 110 to define the new device 160. In other words, each modeled device 160 is represented in the database 150 as a tuple 152-N in the table 152 (or tables) representative of the O-R model 110, and also as a table or set of tables 154 for the data characterizing the device 122-N itself. It should be noted that, for purposes of clarity, the O-R data model 110 table 152 is shown as a single table 152, however, in the exemplary configuration, is actually stored as several tables as shown in the E-R diagram below in FIG. 8.

Figure 2:
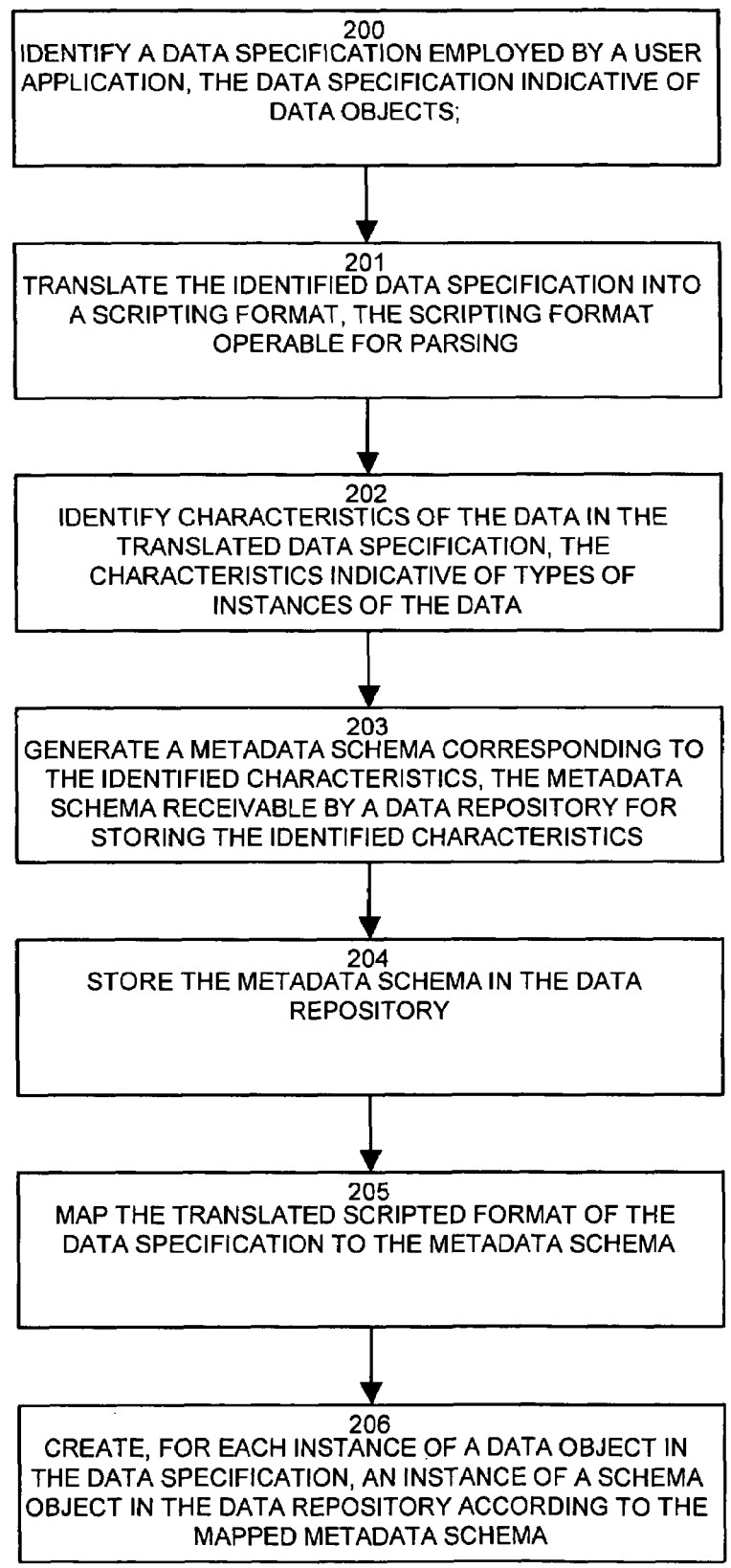
FIG. 2 is a flowchart of modeling a set of data using the O-R data model.

FIG. 2 is a flowchart depicting modeling of a set of data using the O-R data model. Referring to FIGS. 1 and 2, a user or operator identifies a data specification 160-N employed by a user application (not specifically shown), in which the data specification 120 is indicative of data objects 112. The data specification 160-N may be the exemplary CIM standard discussed above, or other ordered representation. Such a data specification 120 corresponds to constructs expressible in a scripting format or language such as XML, Interface Definition Language (IDL) and others, and may be a published standard or specification promulgated by a standards body. A variety of such standards are regularly revised accordingly, by organizations such as the International Standards Organization (ISO), the Internet Engineering Task Force (IETF), the American National Standards Institute (ANSI) and others.

Such a standard typically follows an accepted and/or parseable format, such as the meta object format (MOF) in the CIM example. An MOF compiler 410 (FIG. 3, below) translates the identified data specification 160-N into a scripting format 120, such as XML, in which the scripting format is operable for parsing, as depicted at step 201. An operator or developer, or optionally, an automated process, identifies characteristics of the data in the translated XML data specification 120, in which the characteristics indicative of types of instances of the data, as shown at step 202. Such a process may be executed by inspection of the XML data specification 120, or by parsing the XML representation 120 to extract object and attributes (characteristics) of the data. The characteristics are employed to generate a metadata schema 142 corresponding to the identified characteristics, In which the metadata schema 142 is receivable by a data repository, such as a relational database 150, for storing the identified characteristics, as depicted at step 203.

In the exemplary configuration, the XML definition 120 defines a class corresponding to the new device specifications 160-N in terms of the entity-relation structure of the O-R data model 110, discussed further below with respect to FIG. 8. The O-R data model 110 is an entity-relation structure employable as a relational database schema 142 for storing the metadata schema for the various device types 160-N in the data repository 150, as O-M relational tables 154-N, as shown at step 204. In other words, the O-R data model 110 is a model, or schema, providing relational database 150 definitions of object based data, such as defined by typical Java or C++ code. In this manner, the O-R data model 110 is operable as the "data model's data model," operable to define the other data objects, or classes, in the data specification 120. Further, there are several parallel representations logically depicting the O-R data model discussed herein. The relational database loader 130 then maps the translated scripted format 120 of the data specification to the metadata schema 142, as depicted at step 205. The O-R data model 110 depicts and Entity-Relation format (FIG. 8), as is known to those of skill in the art regarding relational database design, and the relational database schema 142 (metadata schema) identifies tables 152 in the relational database 150 operable to implement the O-R data model 110 for defining the data objects derived from the raw data specification 400 (FIG. 3, below).

A metadata loader 130 then begins an iterative process of loading the XML scripted specification 120 to the relational database 150 by storing the data specification 120 according a the mapping from the scripted format 120 to the metadata schema 142, as depicted at step 206. In other words, the metadata loader 130 creates, for each instance of a data object in the data specification 120, an instance of a schema object 152-1 . . . 152-N in the data repository 150 according to the mapped metadata schema 142. In the exemplary configuration, the metadata loader 130 creates an entry according to the O-R data model 110 by writing entries 152-N to the O-R data model 110 relational tables 154 defining each of the classes specified by the data specification 120, discussed in further detail below.

Figure 3:
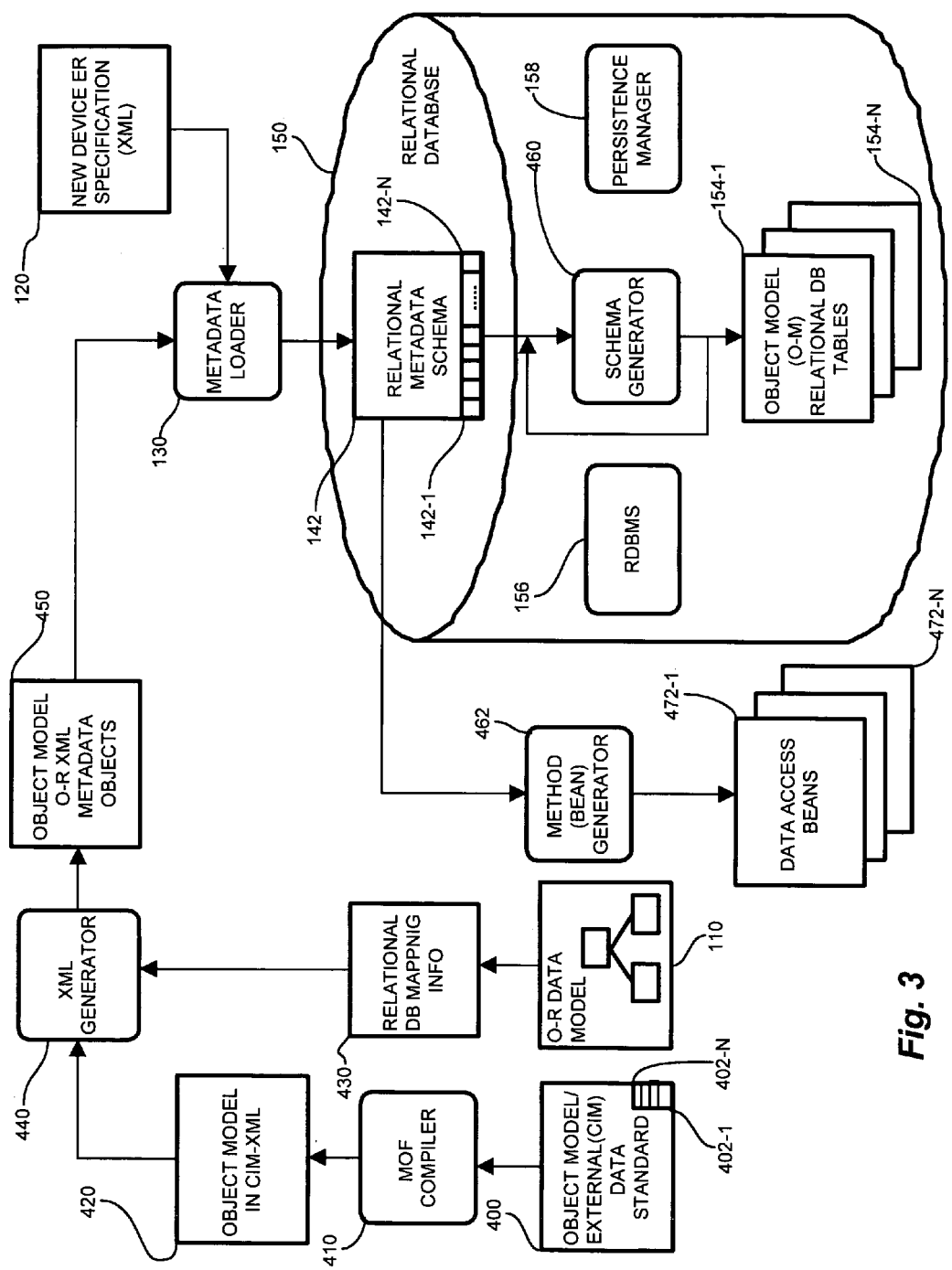
FIG. 3 is a block diagram of creation of the O-R data model and modeling of candidate data using the created data model.

FIG. 3 is a block diagram of creation of the O-R data model 110 and modeling of candidate data using the created data model. Referring to FIG. 3, the O-R data model 110 as in FIG. 1 is shown in greater detail. The exemplary O-R data model 110 derives from the characteristics of a data object (i.e. device type specifications 160-N) such as that embodied in Java or C++, and allows a data object to be modeled in a relational database for processing as disclosed herein. The O-R data model 110, as input to the metadata loader 130, is an XML representation, shown below in table 1, that codifies the entity-relation form in FIG. 7, discussed further below. In the exemplary configuration illustrated, the O-R data model 110 allows modeling of a general data object by a relational database 150 such that the high speed access performance of the relational database 150 is employable for C++ and Java objects. The exemplary configuration employs XML as the scripting language for defining the objects, and employs an Oracle® relational database schema, however alternate scripting formats and databases may be employed in alternate configurations.

Figure 4:
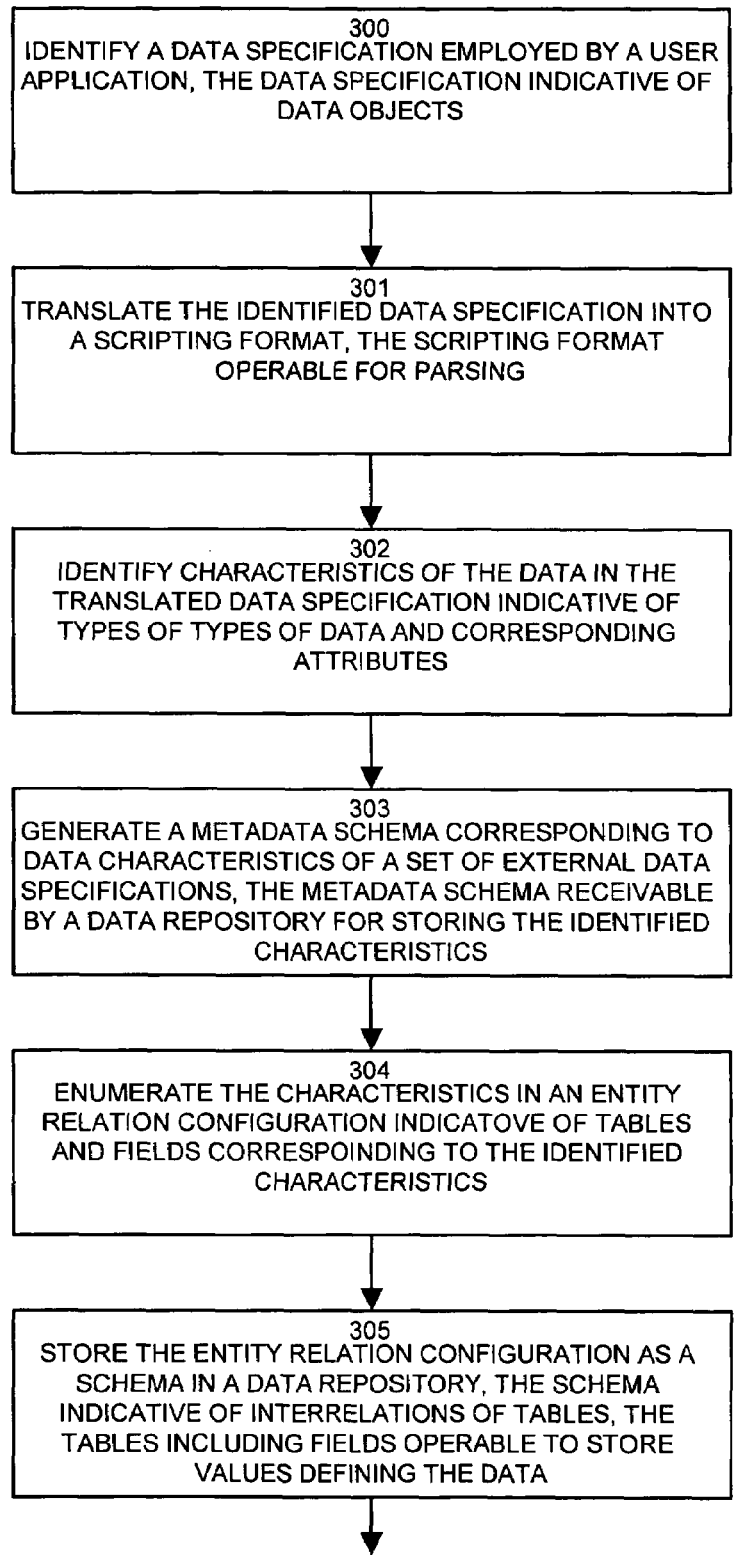
FIGS. 4-6 are a flowchart for creating the data model and employing the data model for creating relational data objects in the extensible framework of FIG. 1.
Figure 5:
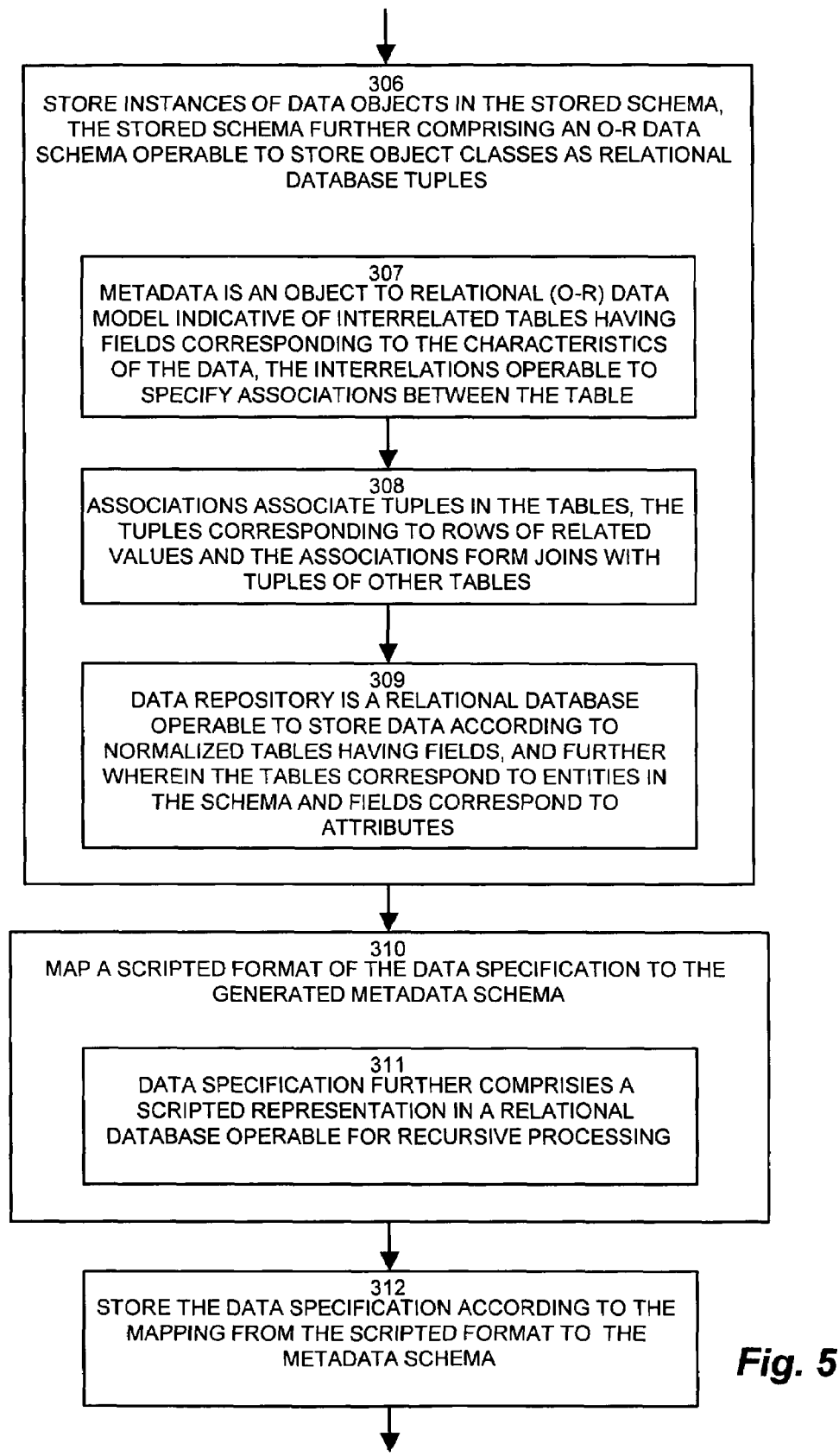
Figure 6:
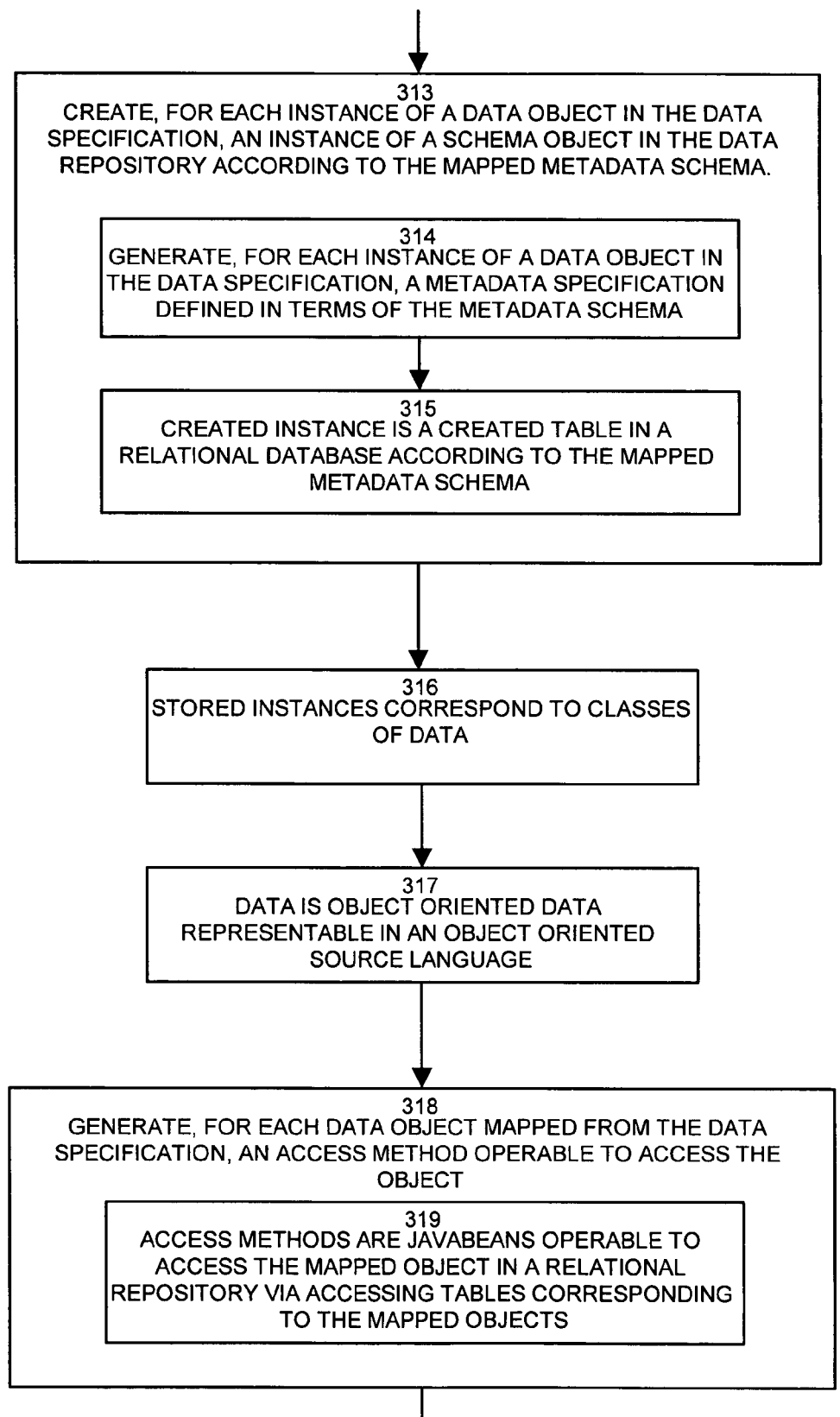

Continuing to refer to FIGS. 1 and 3, modeling of object data for a relational database using the O-R data model occurs using the sequence depicted in FIG. 3, and is described in further detail with respect to the flowchart in FIGS. 4-6. In the exemplary configuration, an external data standard, such as the Common Information Model (CIM) standard, is promulgated by empowered standards bodies, employed herein as an exemplary object model 400. The object model (CIM) 400 includes definitions for a plurality of data objects 402-1 . . . 402-N. This representation encompasses CIM data standard and application specific object in MOF form. Further, an alternative basis, such as another data standard or set of normalized definitions, rather then the exemplary CIM standard, may be employed as the object model 400. The Meta Object Format (MOF) 410 compiler receives the object model 400 definitions for generating the object model in CIM-XML 420 corresponding to the object model (O-M) objects 402. Accompanying the O-M data 400 is relational DB mapping info 430, which are XML definitions supplementing the CIM-XML 420 for defining the O-M objects 402 as relational database definitions.

An XML generator 440 receives the O-R data model 110 and the object model in CIM-XML 420 along with the XML relational mapping info 430 to generate the object model in O-R XML metadata CIM representation 450, which is a set of XML definitions enumerating the exemplary CIM definitions, along with the mapping info 430, which are operable to be loaded into the relational database 150, such as an Oracle database. The CIM-XML is expected to be a subset of the promulgated CIM standard, encompassing on the order of 300-400 data objects of approximately 1300 definitions in the current CIM standard. From the O-R data model 110, the object model in CIM-XML 420 and the mapping info 430 the XML generator 440 creates a unified object model in O-R XML relational definition 450, in the exemplary case indicative of the CIM model 400. It should be noted that the CIM standard 400 is an exemplary set of object definitions employed for illustrative purposes herein, and the methods and operations disclosed are operable to other general definitions wherein expression as relational data in a relational database is desirable, particularly for native definitions occurring in object oriented source code such as Java and C++.

The metadata loader 130 receives the O-R XML metadata objects (relational) definition 450 and then creates the relational metadata schema 140 for the relational database 150 in the native database definition format, or language (i.e. an Oracle DB schema). The relational metadata definitions 140 include a plurality of metadata relational entries 142-N for each of the O-R modeled object model objects 402-N, resulting in an O-R data model 110 defined entry 142-N, or tuple, for each CIM-XML entry. From the O-R data model 110 modeled tuples, the database 150, via the native DBMS or other operation, creates relational database schemas. For each entry (tuple) in the relational metadata definitions 140, each corresponding to a CIM object (class), a schema generator 460 generates O-M relational database tables 154-1 . . . 154-N. Also computed from the relational metadata definitions 140 are javabeans 472-N for accessing the created tables 154-N, by a javabean generator 462. In this manner, relational database tables 154 corresponding to the object classes are defined in a dynamic, extensible manner by the schema generator 460, for creating the tables 154-N (i.e. class instantiations), and the databean generator, for generating the corresponding access operations (javabeans) 472-N.

Runtime support for the modeled objects, or classes, is provided by the relational database management system RDBMS 156, and a persistence manager 158. The Persistence Manager (PM) 158 is the component that interfaces between the in-memory object representations in O-M relational DB table form 154-N and their manifestations in the relational database. The PM 158 has access to the metadata in the database and converts access requests from objects into SQL to access the database. The persistence manager 158 also manages connections to the database, manages a connection pool and exposes APIs for transactions on those connections.

Further, the persistence manager 158 presents a late bound and weakly typed API. The API methods are well-known and typically represent behavior (the action of an object-action pair). The parameters are typically strings that name the objects and attributes upon which to operate. The persistence manager 158 implements Create-Retrieve-Update-Delete (CRUD) operations that analyze the requests, looks up the object and attributes strings in the in the metadata database 150 and validate them as existing in the object model, looks up the locations of these objects in the relation database and generates the SQL queries for the operation. It then renders the returned relational record set information into a normalized object, or object set, with accessor functions for the various attributes returned. These accessor functions are also late bound and typically consist of arguments that name attributes as strings. In this manner, the persistence manager 158 handles datatype conversion. Conventional datatype conversion had been typically performed by the client application. In addition, to make this useable in data-driven applications the persistence manager 158 also presents an API that lets an application query the metadata 140. i.e. an application can ask the persistence manager 158 about the form and structure of the data; the application can then formulate queries about these O-M relational DB tables 154-N without needing specific semantic knowledge about the object.

In contrast to the late binding provided via the persistence manager 158, in alternate configurations, another API mechanism employs an early-bound API with compile-time (strongly-typed) semantics. From the same metadata that holds the data model 110, a process is run that generates O-O source code (JAVA beans) and maintains a full O-O hierarchy and object semantics. This data-driven process starts with the metadata description in the metadata database. During code generation this description is queried, the output resultsets are converted to XML that is then run through an XSL translation to produce the generated code. The beans expose accessor functions that perform compile-time type checking. The persistence manager's 158 second interface can be passed these objects and performs CRUD operations upon them.

FIGS. 4-6 are a flowchart for creating the O-R data model 142 and employing the data model 142 for adding data objects in the extensible framework of FIG. 3. Referring to FIGS. 3-6, generation of the metadata schema corresponding to O-R data model 110 is preceded by identification of a data specification employed by a user application (not specifically shown), in which the data specification 400 is indicative of one or more O-M data objects 402-1 . . . 402-N, as depicted at step 300. The O-R data model 110, therefore, is adaptable to each of the data objects 402-N for expressing the data objects 402-N in a relational database form by defining an entry 142 in the relational metadata table 140 according to the metadata schema 142, and then defining new schemas 152-N corresponding to the defined object class itself, now described in further detail.

The MOF compiler 410 translates the identified data specification 400 from a meta object format (MOF) 402, into the CIM-XML format 420, in which the CIM-XML format is operable for further parsing to define a set of relational DB schemas 142-N for each of the classes in the data specification 400, as shown at step 301.

A data modeling process identifies characteristics of the data in the translated data specification in the object model CIM-XML form 420, in which the characteristics are indicative of types of instances of the data. Alternatively, such a modeling operation may occur directly from the published data standard 400 prior to translation into the CIM-XML version 420. In either case, the modeling process identifies characteristics of data indicative of types of data and corresponding attributes, as depicted at step 302. From the types and attributes, the modeling process generates the O-R data model 110, corresponding to data characteristics of a the set of external data specifications 400, in which the O-R data model 110 is definable as the metadata schema 142, receivable by a data repository 150, such as the exemplary relational database, for storing the identified characteristics, as depicted at step 303. Such a data schema is typical for representation of data in a relational database, as is known to those of skill in the art. Alternative representations are implementable. The metadata schema 142 enumerates the characteristics in an entity relation configuration indicative of tables (FIG. 8, 600-614) and fields corresponding to the identified characteristics, as depicted at step 304 and shown in further detail below in the entity relation (ER) diagram of FIG. 7. The data repository 150, i.e. relational database, stores the entity relation configuration as a schema in the data repository, in which the schema is indicative of interrelations of tables, the tables including fields operable to store values defining the data, as depicted at step 305.

As indicated above, once the O-R data model 110 is codified as a schema 142 in the relational database 150, the individual data classes of the data standard may also be codified as entries in the table 152-N corresponding to the O-R data model 110, as shown at step 306. Accordingly, the relational database 150 iteratively stores instances of data objects in the stored schema 142, in which the stored schema further comprises an O-R data schema operable to store object classes as relational database tuples. The stored metadata schema 142 therefore includes entries 152-N for each class 402-N of objects from the data specification 400.

The exemplary metadata schema 142 is, therefore, an object to relational (O-R) data model indicative of interrelated tables having fields corresponding to the characteristics of the data, in which the interrelations operable to specify associations between the tables, as shown at step 307. As is known to those of skill in the art, relational databases typically store data in multidimensional table structures, and process data by performing joins between such tables. The joins match certain fields of each table as a tuple encompassing all fields of each joined entry. The joins, which may be inclusive of all entries in each table (a so-called natural join) or may specify specific entries to join according to a conditional criteria, define the interrelations, or associations. Therefore, the associations associate tuples in the tables 154, in which the tuples correspond to rows (entries) of related values, and the associations form joins with tuples of other tables 154 based on matching values, as depicted at step 308. The exemplary data repository as discussed above is a relational database 150 operable to store data according to normalized tables 154 having fields, and further wherein the tables correspond to entities in the schema and fields correspond to attributes of the entries, typically expressed as rows, as described at step 309. Alternate configurations may employ other database engines having other normalization techniques.

Therefore, in summary, the generated metadata schema 142 is a relational representation indicative of entities and relations adapted to be stored in a relational repository 150, and the scripted form of the O-R database schema 450 is indicative of an object representation indicative of classes of objects operable to include instances of other classes of objects, thus adapted to typical object based architectures. Following implementation of the metadata schema 142 representing the general O-R model 110, the relational database maps the scripted format 450 of the data specification 400 to the generated metadata schema 142, as depicted at step 310. In the exemplary configuration, the data specification 110 is a scripted representation in a relational database operable for recursive processing, such as XML, as depicted at step 311. Accordingly, the relational database 150 stores each of the objects 402-N of the data specification according to the mapping from the scripted XML format 450 to the metadata schema 142, as depicted at step 312.

Following step 312, the database 150 tables corresponding to the metadata schema 142 are populated with entries corresponding to each of the classes from the data specification 400, including several hundred of the roughly 1300 object classes 402-N in the exemplary CIM standard data specification 400. Accordingly, the metadata loader 130 creates, for each instance of a data object 402-N in the data specification 400, an instance of a schema object 154-N (i.e. table) in the data repository 140 according to the mapped metadata schema 142, as depicted at step 313. This operation includes generating, for each instance of a data object 402-N in the data specification 400, a metadata specification in relational table form 154-N defined in terms of the metadata schema 142, via a schema generator 460 as shown at step 314. In the exemplary configuration, the created instance is a created table 154-1 . . . 154-N in a relational database according to the mapped metadata schema 142, as shown at step 315.

As indicated above, the exemplary configuration includes stored instances 154-N corresponding to classes 402-N of data, as shown at step 316. Further, each of the tables represents object oriented data representable in an object oriented source language, such as Java or C++, as depicted at step 317, and operable to be invoked as objects from the corresponding source language. In this manner, the O-R model 110 provides a mechanism for the object source languages to directly interface with the relational database at the object level. Such an interface avoids retrieving large quantities (entries) of relational data for translation and processing by an object based language, but rather allows the object based language to reference an object directly, thus employing the query engine and optimization of the native relational database 150.

In conjunction with the schema 152-N generation and corresponding tables 154-N, a method (bean) generator 462 also generates, for each data object 402-N mapped from the data specification 400, an access method 472-N operable to access the mapped object tables 154-N, as shown at step 318. In the exemplary configuration, the access methods 472-N are javabeans operable to access the mapped object 152-N in the relational database 150 repository via accessing tables 472-N corresponding to the mapped objects, 152-N as depicted at step 319.

Figure 7:
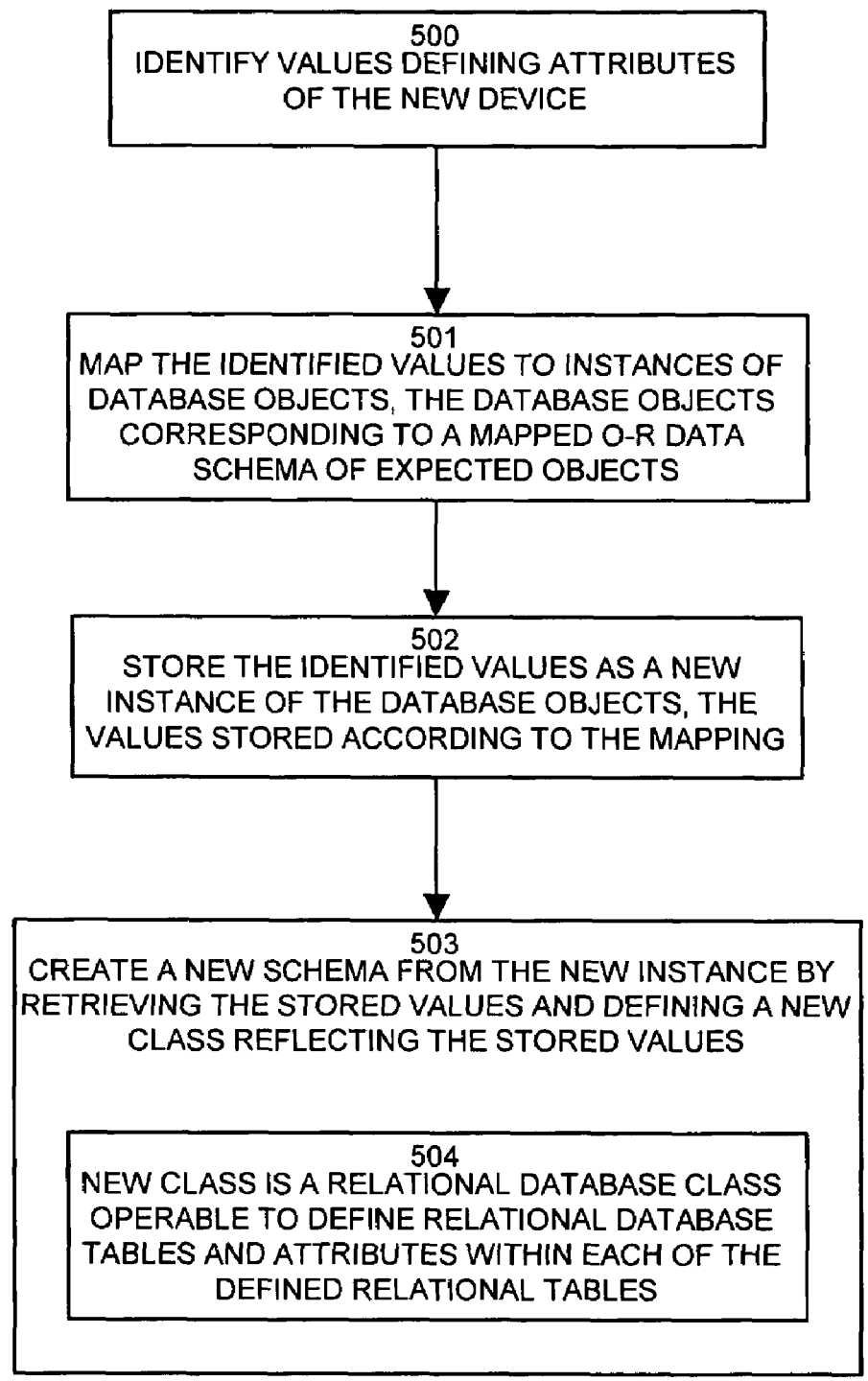
FIG. 7 is a flowchart for employing the data model for adding data objects in the extensible framework of Fig.

FIG. 7 is a flowchart for introducing a data object into the relational database using the extensible metadata framework. Following initial population of the relational database 150 with the O-R metadata table 140 and the corresponding object class specific tables 154-1 . . . 154-N, the configuration is adaptable to receive new data classes corresponding to new devices 122 in the environment 110. The new data classes are received by the schema generator 460 for generating new schemas for instantiating objects corresponding to the new devices 122. Accordingly, the method of configuring a new device 122-N according to the preexisting data model 42 includes identifying values defining attributes of the new device 122-N, as depicted at step 500, and mapping the identified values to instances of database objects (relational tables) 154, in which the database objects corresponding to the mapped O-R data schema 142 of expected objects, as shown at step 501

The metadata loader 130 stores the identified values as a new instance of the database objects in the metadata relational table 152, in which the values are stored according to the O-R mapping from the O-R data model 110, as shown at step 502. The device attributes take the form of an XML specification 120, similar to the format employed for the CIM relational XML representation 450, and the metadata loader 130 creates a metadata relational entry 142 in the metadata relational table 140, and a corresponding table 154 for entries (object) for the new device 122 instantiations. The RDBMS 156 then creates a new schema table 154-N from the new instance by retrieving the stored values and defining a new class reflecting the stored values in the metadata table 142, as depicted at step 503. The new class 142-N is a relational database class operable to define relational database tables 154-N and attributes within each of the defined schemas 142-N, as depicted at step 504.

FIG. 8 is a schema 140 diagram of the O-R data model 110 of FIG. 3 having relational data entities. Referring to FIG. 8, the schema illustrates the tables (entities) and relations in the O-R data model 110. As indicated above, the actual tables 600 illustrate a logical set of relational entries 152-N, each corresponding to a relational table 154-N. The tables include the class names 602, the corresponding qualifiers 604, properties of the class 606 and qualifiers 608. A methods table 610 indicates the methods applicable to the class, also corresponding to the data access beans 472-N, and the parameters 614 for each of the methods 610. The tables in the schema also include an enumerations table 612 for enumerated tables. The corresponding O-R XML schema is shown in Table I.

TABLE I

```
<?xml version="1.0" encoding="UTF-8"?>
<xs:schema xmlns:xs="URL:www.w3.org/2001/XMLSchema" elementFormDefault="qualified">
    <xs:element name="CIMClass">
        <xs:complexType>
            <xs:sequence>
                <xs:element ref="property" minOccurs="0" maxOccurs="unbounded"/>
                <xs:element ref="method" minOccurs="0" maxOccurs="unbounded"/>
                <xs:element ref="qualifier" minOccurs="0" maxOccurs="unbounded"/>
                <xs:element ref="index" minOccurs="0" maxOccurs="unbounded"/>
            </xs:sequence>
            <xs:attribute name="className" type="xs:string" use="required"/>
            <xs:attribute name="isTable">
                <xs:simpleType>
                    <xs:restriction base="xs:NMTOKEN">
                        <xs:enumeration value="T"/>
                        <xs:enumeration value="F"/>
                    </xs:restriction>
                </xs:simpleType>
            </xs:attribute>
            <xs:attribute name="tableName" type="xs:string"/>
            <xs:attribute name="parentClassName" type="xs:string"/>
            <xs:attribute name="tablespaceName" type="xs:string"/>
            <xs:attribute name="UICategory" type="xs:string"/>
            <xs:attribute name="parentUICategory" type="xs:string"/>
            <xs:attribute name="isFactory">
                <xs:simpleType>
                    <xs:restriction base="xs:NMTOKEN>
                        <xs:enumeration value="T"/>
                        <xs:enumeration value="F"/>
                    </xs:restriction>
                </xs:simpleType>
            </xs:attribute>
            <xs:attribute name="pkTablespaceName" type="xs:string"/>
            <xs:attribute name="viewName" type="xs:string"/>
            <xs:attribute name="isView">
                <xs:simpleType>
                    <xs:restriction base="xs:NMTOKEN">
                        <xs:enumeration value="T"/>
                        <xs:enumeration value="F"/>
                    </xs: restriction>
                </xs:simpleType>
            </xs:attribute>
            <xs:attribute name="deleteMe">
                <xs:simpleType>
                    <xs:restriction base="xs:NMTOKEN">
                        <xs:enumeration value="T"/>
                        <xs:enumeration value="F"/>
                    </xs:restriction>
                </xs:simpleType>
            </xs:attribute>
            <xs:attribute name="isBeanOnly">
                <xs:simpleType>
                    <xs:restriction base="xs:NMTOKEN">
                        <xs:enumeration value="T"/>
                        <xs:enumeration value="F"/>
                    </xs:restriction>
                </xs:simpleType>
```

TABLE I-continued

```
                </xs:attribute>
            </xs:complexType>
        </xs:element>
        <xs:element name="ESM-metadata">
            <xs:complexType>
                <xs:sequence>
                    <xs:element ref="schemaSystem" minOccurs="0" maxOccurs="unbounded"/>
                    <xs:element ref="CIMClass" minOccurs="0"/>
                </xs:sequence>
            </xs:complexType>
        </xs:element>
        <xs:element name="index">
            <xs:complexType>
                <xs:sequence>
                    <xs:element ref="indexColumn" maxOccurs="unbounded"/>
                </xs:sequence>
                <xs:attribute name="indexName" type="xs:string" use="required"/>
                <xs:attribute name="tableName" type="xs:string" use="required"/>
                <xs:attribute name="isUnique">
                    <xs:simpleType>
                        <xs:restriction base="xs:NMTOKEN">
                            <xs:enumeration value="T"/>
                            <xs:enumeration value="F"/>
                        </xs: restriction>
                    </xs:simpleType>
                </xs:attribute>
                <xs:attribute name="percentFree" type="xs:string"/>
                <xs:attribute name="tablespaceName" type="xs:string"/>
            </xs:complexType>
        </xs:element>
        <xs:element name="indexColumn">
            <xs:complexType>
                <xs:attribute name="columnName" type="xs:string" use="required"/>
                <xs:attribute name="indexSeq" type="xs:string"/>
            </xs:complexType>
        </xs:element>
        <xs:element name="method">
            <xs:complexType>
                <xs:sequence>
                    <xs:element ref="parameter" minOccurs="0" maxOccurs="unbounded"/>
                    <xs:element ref="qualifier" minOccurs="0" maxOccurs="unbounded"/>
                </xs:sequence>
                <xs:attribute name="methodName" type="xs:string" use="required"/>
                <xs:attribute name="description" type="xs:string"/>
                <xs:attribute name="methodType" use="required">
                    <xs:simpleType>
                        <xs:restriction base="xs:NMTOKEN">
                            <xs:enumeration value="void"/>
                            <xs:enumeration value="boolean"/>
                            <xs:enumeration value="datetime"/>
                            <xs:enumeration value="String"/>
                            <xs:enumeration value="char16"/>
                            <xs:enumeration value="ref"/>
                            <xs:enumeration value="uint8"/>
                            <xs:enumeration value="sint8"/>
                            <xs:enumeration value="uint16"/>
                            <xs:enumeration value="sint16"/>
                            <xs:enumeration value="uint32"/>
                            <xs:enumeration value="sint32"/>
                            <xs:enumeration value="uint64"/>
                            <xs:enumeration value="sint64"/>
                            <xs:enumeration value="real32"/>
                            <xs:enumeration value="real64"/>
                        </xs:restriction>
                    </xs:simpleType>
                <xs:attribute>
                <attribute name="isLocal">
                <xs:simpleType>
                    <xs:restriction base="xs:NMTOKEN">
                        <xs:enumeration value="T"/>
                        <xs:enumeration value="F"/>
                    </xs:restriction>
                </xs:simpleType>
            </xs:attribute>
            <xs:attribute name="isGenerated">
                <xs:simpleType>
                    <xs:restriction base="xs:NMTOKEN">
                        <xs:enumeration value="T"/>
                        <xs:enumeration value="F"/>
```

TABLE I-continued

```
                </xs:restriction>
            </xs:simpleType>
        </xs:attribute>
    </xs:complexType>
"/xs:element>
<xs:element name="parameter">
    <xs:complexType>
        <xs:attribute name="parameterName" type="xs:string" use="required"/>
        <xs:attribute name="description" type="xs:string"/>
        <xs:attribute name="parameterType" type="xs:string" use="required"/>
        <xs:attribute name="isArray">
            <xs:simpleType>
                <xs:restriction base="xs:NMTOKEN">
                    <xs:enumeration value="T"/>
                    <xs:enumeration value="F"/>
                </xs:restriction>
            </xs:simpleType>
        </xs:attribute>
        <xs:attribute name="direction">
            <xs:simpleType>
                <xs:restriction base="xs:NMTOKEN">
                    <xs:enumeration value="IN"/>
                    <xs:enumeration value="INOUT"/>
                    <xs:enumeration value="OUT"/>
                </xs:restriction>
            </xs:simpleType>
        </xs:attribute>
    </xs:complexType>
</xs:element>
<xs:element name="property">
    <xs:complexType>
        <xs:sequence>
            <xs:element ref="qualifier" minOccurs="0" maxOccurs="unbounded"/>
        </xs:sequence>
        <xs:attribute name="propertyName" type="xs:string" use="required"/>
        <xs:attribute name="isNullable">
            <xs:simpleType>
                <xs:restriction base="xs:NMTOKEN">
                    <xs:enumeration value="T"/>
                    <xs:enumeration value="F"/>
                </xs:restriction>
            </xs:simpleType>
        </xs:attribute>
        <xs:attribute name="columnSeq" type="xs:string"/>
        <xs:attribute name="conversionFunction" type="xs:string"/>
        <xs:attribute name="columnName" type="xs:string"/>
        <xs:attribute name="isPrimaryKey">
            <xs:simpleType>
                <xs:restriction base="xs:NMTOKEN">
                    <xs:enumeration value="T"/>
                    <xs:enumeration value="F"/>
                </xs:restriction>
            </xs:simpleType>
        </xs:attribute>
        <xs:attribute name="mofDataType">
            <xs:simpleType>
                <xs:restriction base="xs:NMTOKEN">
                    <xs:enumeration value="boolean"/>
                    <xs:enumeration value="datetime"/>
                    <xs:enumeration value="string"/>
                    <xs:enumeration value="char16"/>
                    <xs:enumeration value="ref"/>
                    <xs:enumeration value="uint8"/>
                    <xs:enumeration value="sint8"/>
                    <xs:enumeration value="uint16"/>
                    <xs:enumeration value="sint16"/>
                    <xs:enumeration value="uint32"/>
                    <xs enumeration values="int32"/>
                    <xs:enumeration value="uint64"/>
                    <xs:enumeration value="sint64"/>
                    <xs:enumeration value="real32"/>
                    <xs:enumeration value="real64"/>
                </xs:restriction>
            </xs:simpleType>
        </xs:attribute>
        <xs:attribute name="dataLength" type="xs:string"/>
        <xs:attribute name="dataPrecision" type="xs:string"/>
        <xs:attribute name="isHistory">
            <xs:simpleType>
```

TABLE I-continued

```
            <xs:restriction base="xs:NMTOKEN">
                <xs:enumeration value="T"/>
                <xs:enumeration value="F"/>
            </xs:restriction>
        </xs:simpleType>
    </xs:attribute>
    <xs:attribute name="isArray">
        <xs:simpleType>
            <xs:restriction base="xs:NMTOKEN">
                <xs:enumeration value="T"/>
                <xs:enumeration value="F"/>
            </xs:restriction>
        </xs:simpleType>
    </xs:attribute>
    <xs:attribute name="isLocal">
        <xs:simpleType>
            <xs:restriction base="xs:NMTOKEN">
                <xs:enumeration value="T"/>
                <xs:enumeration value="F"/>
            </xs:restriction>
        </xs:simpleType>
    </xs:attribute>
    <xs:attribute name="isFactory">
        <xs:simpleType>
            <xs:restriction base="xs:NMTOKEN">
                <xs:enumeration value="T"/>
                <xs:enumeration value="F"/>
            </xs:restriction>
        </xs:simpleType>
    </xs:attribute>
    <xs:attribute name="isUnique">
        <xs:simpleType>
            <xs:restriction base="xs:NMTOKEN">
                <xs:enumeration value="T"/>
                <xs:enumeration value="F"/>
            </xs:restriction>
        </xs:simpleType>
    </xs:attribute>
    <xs:attribute name="isDeleteCascade">
        <xs:simpleType>
            <xs:restriction base="xs:NMTOKEN">
                <xs:enumeration value="T"/>
                <xs:enumeration value="F"/>
            </xs:restriction>
        </xs:simpleType>
    </xs:attribute>
    <xs:attribute name="isEncrypted">
        <xs:simpleType>
            <xs:restriction base="xs:NMTOKEN">
                <xs:enumeration value="T"/>
                <xs:enumeration value="F"/>
            </xs:restriction>
        </xs:simpleType>
    </xs:attribute>
    <xs:attribute name="isEsmid">
        <xs:simpleType>
            <xs:restriction base="xs:NMTOKEN">
                <xs:enumeration value="T"/>
                <xs:enumeration value="F"/>
            </xs:restriction>
        </xs:simpleType>
    </xs:attribute>
    <xs:attribute name="IsFromMof">
        <xs:simpleType>
            <xs:restriction base="xs:NMTOKEN">
                <xs:enumeration value="T"/>
                <xs:enumeration value="F"/>
            </xs:restriction>
        </xs:simpleType>
    </xs:attribute>
    <xs:attribute name="defaultValue" type="xs:string"/>
    <xs:attribute name="fkName" type="xs:string"/>
    <xs:attribute name="fkTableName" type="xs:string"/>
    <xs:attribute name="fkColumnName" type="xs:string"/>
    <xs:attribute name="isConstrained">
        <xs:simpleType>
            <xs: restriction base="xs:NMTOKEN">
                <xs:enumeration value="T"/>
                <xs:enumeration value="F"/>
```

TABLE I-continued

```
        </xs:restriction>
      </xs:simpleType>
    </xs:attribute>
```

Figure 9:
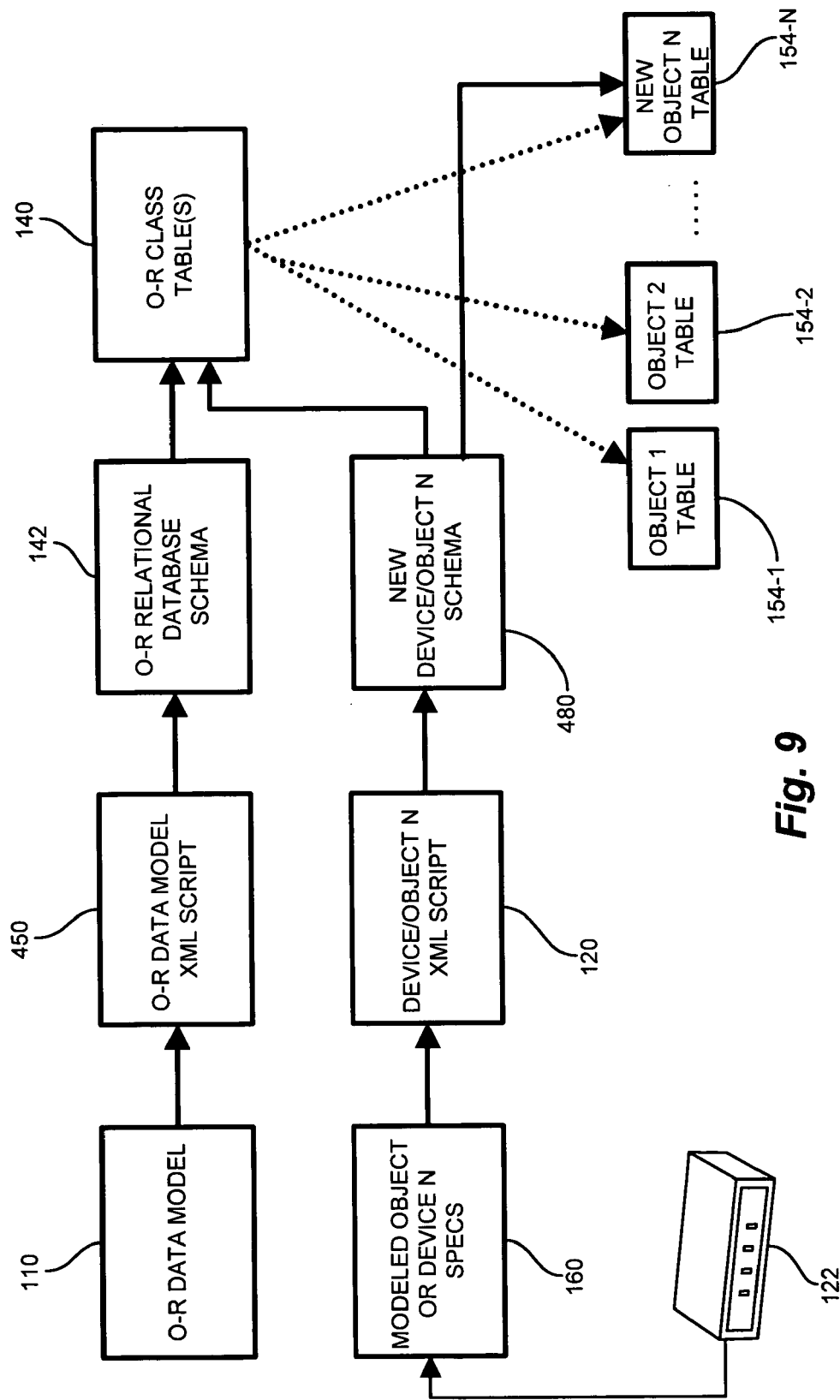
FIG. 9 is a data flow diagram of the O-R data model modeling the new set of data of FIG. 8 into the managed information environment.

FIG. 9 is a data flow diagram of the O-R data model modeling the new set of data of FIG. 8 into the managed information environment of FIGS. 1 and 3. Referring to FIG. 9, the flow of data for adding a new class corresponding to a new object, such as device 122 is shown. Typically, a new device specification is accompanied by a set of device specifications. The new device specifications 160 specify the various characteristics of the new device N 122, via any suitable medium such as a read.me file, paper specification, or other. It should be noted that, as the O-R data model 110 is operable to model any suitable object expressible in terms of the model 110, the exemplary device 122 is intended as illustrative, rather than limiting. A variety of objects, such as data sets, code objects, interfaces, communication links, and other external devices, are similarly definable. The specification 160 is employed to define a scripted version of the specifications 160, such as the exemplary XML script. As indicated above, the O-R data model 110 modeling the relational O-R representation has previously been loaded into the relational DB as the O-R relational database schema 142 from a previously generated XML script 450. The O-R class tables 140, representing the exemplary O-R E-R structure of FIG. 8, include several tables, although alternate configurations may include one or more tables. The O-R class tables represent each new O-R class corresponding to a new device as a tuple, or set of entries, such as one or more rows. For each new O-R class, the new device script 120 is employed to define a new device N schema 480, which the RDBMS employs to both write a new entry in the O-R class tables 140 and to create a new object (or device) specific class table 154-N, for storing instantiations of the new device 122.

In alternate configurations, an additional aspect of the APIs is their handling of enumerations. These are a pre-specified list of legal values that an attribute may take along with human-understandable developer-friendly constants that may be used in their place in code. The object specification language allows for the specification of enumerations and aliases for their values. These are also stored in metadata and are available through both the early- and late-bound APIs. The early-bound APIs allow for the constant values to be used as parameters in the accessor methods. There are also methods that can retrieve the set of allowable values. The late-bound API has methods that will also accept 1) values as strings that are converted to the proper type and 1) constants as strings that are looked up in metadata and translated to the correct value.

Particular configurations employ additional mechanisms to provide congruency in the areas of mismatch between object models and relational models that is resolved in this framework is the handling of relationships. In relational databases the relationships between tables are implicit, or at most exposed in integrity constraints. In object languages they are usually explicit and array/pointer-based. In this framework relationships between objects are also objects. They are special in that they may store a Reference datatype that points to other objects. The Object-based specification language includes specifications for relationship objects. This information is rendered into the XML metadata format and stored in the metadata database. During database schema generation these relationships are transformed into their relational table mappings. These relationship objects are used in the persistence API to navigate from objects to related objects. The persistence manager looks up the metadata for the relational object, determines the particular storage mechanism used and generates the appropriate join logic in SQL queries to the relational database. The API hides the relational implementation details and presents an object navigational interface to the client.

It should be noted the O-R data model 110 adds extensibility to the framework, particularly run-time extensibility, through the extensive use of metadata. A client describes additional object schema, or extensions to the existing schema in XML conformant to the metadata DTD. This metadata is loaded into the metadata database and then the schema generation tool is run. New and extended objects can then be accessed by code using the run-time, late-bound API. In addition, because it implements an object model, an application code that is written to process bases classes, whether using the run-time or compile-time API, automatically accesses the base class attributes of any newly derived classes that have been added in the field. This allows for true SDK extensibility of the data model yet allowing an existing application to run that, when it shipped, never knew about the new classes.

It should be noted that the exemplary implementation discussed above employs an XML based metadata definition, and a relational database for storing the resulting definitions. Alternative configurations may employ other scripting languages and/or database repositories. Accordingly, the systems and methods discussed above with respect to the exemplary XML output pages are applicable to an alternative scripting or processing format or protocol operable for responsive delivery and display to a user.

Those skilled in the art should readily appreciate that the programs and methods for an object model operable for dynamic additions to an existing baseline of modeled data specifications as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for an object model operable for dynamic additions to an existing baseline of modeled data specification has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of generating code comprising:
generating a metadata schema corresponding to data characteristics of a set of external data specifications, the metadata schema receivable by a data repository for storing the identified characteristics;
mapping a scripted format of the data specification to the generated metadata schema, wherein the generated metadata schema is a relational representation indicative of entities and relations stored in a relational repository, and the scripted format of the database specification is indicative of an object representation of classes of objects including instances of other classes of objects;
storing the data specification according to the mapping from the scripted format to the metadata schema; and
creating, for each instance of a data object in the data specification, an instance of a schema object in the data repository according to the metadata schema;
identifying, in a Meta Object Format (MOF) compiler, a data specification employed by a user application, the data specification indicative of data objects; and
translating, in an XML generator, the identified data specification into the scripted format, the scripted format being parsable, the XML generator generating metadata objects including the scripted format, the scripted format configured to identify characteristics of the data in the translated data specification, the characteristics indicative of types of instances of the data.

2. The method of claim 1 further comprising generating, for each instance of a data object in the data specification, a metadata specification defined in terms of the metadata schema.

3. The method of claim 1 wherein created instance is a created table in a relational database according to the mapped metadata schema.

4. The method of claim 3 wherein the metadata is an object to relational (O-R) data model indicative of interrelated tables having fields corresponding to the characteristics of the data, the interrelations specifying associations between the tables.

5. The method of claim 4 wherein the data repository is a relational database storing data according to normalized tables having fields, and further wherein the tables correspond to entities in the schema and fields correspond to attributes.

6. The method of claim 5 wherein the associations associate tuples in the tables, the tuples corresponding to rows of related values and the associations form joins with tuples of other tables.

7. The method of claim 1 further comprising generating, for each data object mapped from the data specification, an access method to access the object.

8. The method of claim 7 wherein the access methods are javabeans configured to access the mapped object in a relational repository via accessing tables corresponding to the mapped objects.

9. A method of generating code comprising:
identifying a data specification employed by a user application, the data specification indicative of data objects;
translating the identified data specification into a parsable scripting format;
identifying characteristics of the data in the translated data specification, the characteristics indicative of types of instances of the data;
generating, a metadata schema corresponding to the identified characteristics, the metadata schema receivable by a data repository for storing the identified characteristics, the generated metadata schema being a relational representation indicative of entities and relations adapted to be stored in a relational repository, and the scripting format of the database schema is indicative of an object representation indicative of classes of objects including instances of other classes of objects;
storing the metadata schema in the data repository;
mapping the scripting format of the data specification to the metadata schema;
storing the data specification according to the mapping from the scripting format to the metadata schema; and
creating, for each instance of a data object in the data specification, an instance of a schema object in the data repository according to the mapped metadata schema.

10. The method of claim 9 wherein the data specification further comprises a scripted representation in a relational database configured to perform recursive processing.

11. A data processing device comprising:
a metadata loader generating a metadata schema corresponding to data characteristics of a set of external data specifications, the metadata schema receivable by a data repository storing the identified characteristics;
a schema generator mapping a scripted format of the data specification to the generated metadata schema, the generated metadata schema being a relational representation indicative of entities and relations adapted to be stored in a relational repository, and the scripted format of the data specifications is indicative of an object representation indicative of classes of objects operable to include instances of other classes of objects;
a database management system storing the data specification according to the mapping from the scripted format to the metadata schema, the schema generator responsive to the database management system to create, for each instance of a data object in the data specification, an instance of a schema object in the data repository according to the mapped metadata schema;
a Meta Object Format (MOF) compiler identifying a data specification employed by a user application, the data specification indicative of data objects; and
an XML generator translating the identified data specification into the scripted format, the scripted format being parsable, the XML generator generating metadata objects including the scripted format, the scripted format configured to identify characteristics of the data in the translated data specification, the characteristics indicative of types of instances of the data.

12. The data processing device of claim 11 wherein the schema generator generates, for each instance of a data object in the data specification, a metadata specification defined in terms of the metadata schema.

13. The data processing device of claim 11 wherein the created instance is a created table in a relational database according to the mapped metadata schema.

14. The data processing device of claim 11 wherein the metadata schema is an object to relational (O-R) data model indicative of interrelated tables having fields corresponding to the characteristics of the data, the database management system identifying the interrelations and specifying corresponding associations between the tables.

15. The data processing device of claim 14 wherein the associations associate tuples in the tables, the tuples corresponding to rows of related values and the associations form joins with tuples of other tables.

16. The data processing device of claim 15 wherein the data repository is a relational database storing data according to normalized tables having fields, and further wherein the tables correspond to entities in the schema and fields correspond to attributes.

17. The data processing device of claim 11 further comprising generating, for each data object mapped from the data specification, an access method accessing the object.

18. The data processing device of claim 17 wherein the access methods are javabeans configured to access the mapped object in a relational repository via accessing tables corresponding to the mapped objects.

19. A computer program product having a computer readable medium storing computer program logic embodied in computer program code encoded on a computer readable storage medium comprising:
   computer program code generating a metadata schema corresponding to data characteristics of a set of external data specifications, the metadata schema receivable by a data repository storing the identified characteristics;
   computer program code mapping a scripted format of the data specification to the generated metadata schema;
   computer program code storing the data specification according to the mapping from the scripted format to the metadata schema;
   computer program code creating, for each instance of a data object in the data specification, an instance of a schema object in the data repository according to the mapped metadata schema; and
   computer program code generating, for each instance of the data object in the data specification, a metadata specification defined in terms of the metadata schema, the created instance being a created table in a relational database according to the mapped metadata schema.

20. An encoded set of processor based instructions embodying program logic encoded as program code on a computer readable storage medium comprising:
   program code identifying a set of external data specifications employed by a user application, the data specification indicative of data objects;
   program code translating the set of identified external data specifications into a parsable scripting format; and
   program code identifying characteristics of the data in the translated external data specifications, the characteristics indicative of types of instances of the data;
   program code generating a metadata schema corresponding to data characteristics of the set of external data specifications, the metadata schema receivable by a data repository storing the identified characteristics;
   program code mapping a scripted format of the data specification to the generated metadata schema, the generated metadata schema being a relational representation indicative of entities and relations stored in a relational repository, and a scripted form of the database schema is indicative of an object representation indicative of classes of objects including instances of other classes of objects;
   program code storing the data specification according to the mapping from the scripted format to the metadata schema;
   program code creating, for each instance of a data object in the data specification, an instance of a schema object in the data repository according to the mapped metadata schema; and
   program code generating, for each instance of the data object in the data specification, a metadata specification defined in terms of the metadata schema.

21. A data processing device having a set of encoded processor based instructions on a computer readable storage medium comprising:
   means for identifying a set of external data specifications employed by a user application, the data specification indicative of data objects;
   means for translating the set of identified external data specifications into a parsable scripting format;
   means for identifying characteristics of the data in the translated external data specifications, the characteristics indicative of types of instances of the data;
   means for generating a metadata schema corresponding to data characteristics of the set of external data specifications, the metadata schema receivable by a data repository storing the identified characteristics, the generated metadata schema being a relational representation indicative of entities and relations stored in a relational repository, and a scripted form of the database schema is indicative of an object representation indicative of classes of objects including instances of other classes of objects;
   means for mapping a scripted format of the data specification to the generated metadata schema;
   means for storing the data specification according to the mapping from the scripted format to the metadata schema;
   means for creating, for each instance of a data object in the data specification, an instance of a schema object in the data repository according to the mapped metadata schema; and
   means for generating, for each instance of the data object in the data specification, a metadata specification defined in terms of the metadata schema, the created instance being a created table in a relational database according to the mapped metadata schema.

* * * * *